United States Patent [19]

Koseki et al.

[11] Patent Number: 4,783,277

[45] Date of Patent: Nov. 8, 1988

[54] ABSORPTION-TYPE REFRIGERATOR

[75] Inventors: Yasuo Koseki, Hitachiota; Akira Yamada; Hideaki Kurokawa, both of Hitachi; Katsuya Ebara, Mito; Sankichi Takahashi, Hitachi, all of Japan

[73] Assignee: Hitachi, Ltd., Tokyo, Japan

[21] Appl. No.: 87,023

[22] Filed: Aug. 19, 1987

[51] Int. Cl.$^4$ ............................................... C09K 5/04
[52] U.S. Cl. ........................................ 252/69; 62/109; 62/112
[58] Field of Search ..................... 252/69; 62/109, 112

[56] References Cited

U.S. PATENT DOCUMENTS 4,018,694 4/1977 Anderson ............................ 252/69
4,094,355 6/1978 Blytas .................................. 62/112

OTHER PUBLICATIONS

Luedemann et al., "Absorption Spectra at High Pressures and Temperatures. II. Cobalt (II) and Nickel (II) Halides in Concentrated Alkali Metal Halide Solutions," Ber. Bunsenges. Phys. Chem. 1968, 72(4), 514–23. (CA 69: 39187r).

Paranjape et al., "Characteristics of Water-Calcium Chloride and Water-Lithium Bromide Absorption Heat Pumps," AICHE J. 1986, 32(11), 1924–7. (CA 106: 6918j).

Primary Examiner—Robert A. Wax
Attorney, Agent, or Firm—Antonelli, Terry & Wands

[57] ABSTRACT

An absorbent in a solution which comprises at least one of bromides taking a dihydrate form at room temperature and at least one of halides taking a hexahydrate form at room temperature has a high solubility and a low cost, and is used in a closed, cyclic absorption-type refrigerator.

5 Claims, 4 Drawing Sheets

ABSORPTION-TYPE REFRIGERATOR

BACKGROUND OF THE INVENTION

This invention relates to a closed, cyclic absorption-type refrigerator.

Generally, an aqueous lithium bromide solution is used as an absorbing agent in a closed recyclic, absorption type refrigerator (Japanese Patent Publication No. 60-29872). However, lithium bromide is much more expensive than calcium chloride, etc.

On the other hand, cheap magnesium chloride, calcium chloride, etc. can be utilized as liquid absorbent, but are not suitable for the absorption-type refrigerator owing to their low solubilities.

As to the absorbent for use in the closed, cyclic absorption type refrigerator, research and development of composite absorbents composed of a plurality of absorbent components have been made to conduct the cooling of the absorbent with air and increase their solubilities. For example, composite absorbents based on LiBr-LiCl system, LiBr-$C_2H_6O_2$ system, and LiBr-LiSCN system [Reito (refrigeration), Vol. 56, No. 646, page 11] and that based on LiCl-$CaCl_2$ system [Research and Research Result Report 1 on Effective Utilization of low temperature difference energy, published by Nippon Kikai Gakkai (Japanese Society for Mechanical Engineers) on Mar. 6, 1979, pages 101 to 103] are reported, but optimization of mixing ratios of the absorbent components, etc. have not been disclosed yet.

SUMMARY OF THE INVENTION

A first object of the present invention is to provide an absorbent having a high solubility.

A second object of the present invention is to provide an closed, cyclic absorption-type refrigerator suitable for air cooling.

The first object of the present invention can be attained by an absorbent in a solution state having a high solubility and a low cost, which comprises at least one of halides taking a hexahydrate form at room temperature and at least one of bromides taking a dihydrate form at room temperature.

The second object of the present invention can be attained by a closed, cyclic absorption-type refrigerator using an absorbent in a solution state, which comprises at least one of bromides taking a dihydrate form at room temperature and at least one of halides taking a hexahydrate form at room temperature.

Necessary properties for an absorbent for use in a closed, cyclic absorption-type refrigerator will be explained.

An absorbent in an aqueous solution has so low a water vapor pressure that it has a high capacity to absorb water vapor. The higher the concentration of an absorbent (solute) in an aqueous solution or the lower the temperature of the absorbent in the aqueous solution, the higher the capacity to absorb the water vapor. FIG. 1 schematically shows these properties, where a relationship between the water vapor pressure and the temperature of the aqueous solution of an absorbent is plotted through the concentrations of the aqueous solution of the absorbent as parameters.

As shown in FIG. 1, the higher the concentration of the absorbent (60% > 50%), the lower the water vapor partial pressure ($P_1 > P_2$) at a constant temperature ($T_0$), and the lower the temperature ($T_0 > T_1$), the lower the water vapor partial pressure ($P_1 > P_3$) at a constant concentration (50%). Thus, the capacity to absorb water vapor will be increased. When water as a solvent and an aqueous solution of an absorbent (solute) having a concentration of e.g. 60% are placed separately with each other in a closed vessel to utilize the said properties, and then the aqueous solution side is cooled from temperature $T_0$, the equilibrium water vapor partial pressure $P_2$ of aqueous 60% solution will be dominent as the pressure within the vessel, and cold water at a temperature as low as $T_2$, corresponding to the partial pressure $P_2$, can be obtained from the solvent side (B→A). On the other hand, when the solvent side is heated from temperature $T_0$, the equilibrium water vapor partial pressure $P_0$ of water solvent $P_0$ will be dominant as the pressure in the vessel, and hot water at a temperature as high as $T_3$, corresponding to the partial pressure $P_0$, can be obtained from the aqueous solution side (C > D).

By shifting the water vapor pressure equilibrium between the water solvent and the absorbent (solute) in an aqueous solution, cold water or hot water can be produced, and the available temperature greatly depends upon a concentration level of an aqueous solution of an absorbent i.e. a solubility level.

As a result of extensive studies of applicable compounds as absorbents in an aqueous solution state for use in an absorption type refrigerator, the present inventors have found that halides taking a hydrate form are cheap and have relatively high solubilities. As a result of further studies of the halides, the present inventors have found that bromides and chlorides are more advantageous in the solubility, cost and safety.

The present inventors have still made further studies and have found the following facts: the solubilities of most halides are (1) higher when halides take water of crystallization (for example, KCl or NaCl taking no water of crystallization has a lower solubility than that of $MgCl_2.6H_2O$), (2) higher when the number of water of crystallization is smaller (for example, $LiCl.2H_2O$ has a higher solubility than that of $MgCO_2.6H_2O$), and (3) higher in the case of a bromide than in the case of a chloride (for example, the solubility of LiBr is higher than that of LiCl), but (4) the solubility of single compound is not satisfactory as an absorbent in an aqueous solution. Thus, the present inventors have made extensive studies of increasing the solubility of the absorbent and have found that the solubility of a halide having water of crystallization greatly depends upon the number of water molecules to be hydrated and have experimentally confirmed that the hydration depends upon coexisting ion species, that is, coexisting other halide species, and a miXture of different halides each taking a hydrate form at room temperature has a higher solubility than the solubilities of the single component halides. In view of the facts that the halides to be mixed are (1) higher in the solubility but more expensive in the case of dihydrate and (2) lower in the solubility or cheaper in the case of hexahydrate, the present inventors have selected bromides taking a dihydrate at room temperature, which have the highest solubility among the halides, and cheap halides taking a hexahydrate at room temperature.

The bromides taking a dihydrate at room temperature for use in the present invention include LiBr and $BaBr_2$, and the halides taking a hexahydrate at room temperature include chlorides such as $MgCl_2$, $CaCl_2$, $NiCl_2$, $CoCl_2$, etc., bromides such as $MgBr_2$, $CaBr_2$, $NiBr_2$, $CoBr_2$, etc.

PREFERRED EMBODIMENTS OF THE INVENTION

The present invention will be described in detail, referring to Examples and Drawings.

PROCEDURE FOR MEASURING SOLUBILITY

The following Table shows the species of absorbents in aqueous solutions containing halides taking a hexahydrate form at room temperature as a main agent and halides taking a dihydrate form at room temperature as an additive used in Examples and Comparative Example, and the saturated concentration of the main agent at 0° C.

TABLE

| | Main agent | | |
|---|---|---|---|
| | (Hexahydrate) | Concentration (%) | Additive (dihydrate) |
| Example 1 | $CaCl_2$ | 37.5 | LiBr |
| Example 2 | $CaBr_2$ | 55.5 | LiBr |
| Comparative Example | $CaCl_2$ | 37.5 | LiCl |

300 cc of an aqueous solution containing a main agent at the saturated concentration is placed in a glass cylinder having a capacity of 500 cc and stirred at 60 to 100 rpm in a thermostat water tank at 0° C. and kept uniformly at 0° C. Then, a given weight of an additive is added thereto and dissolved with thorough stirring while adding a given amount of water thereto until a small amount of the additive remains in a solid state in the aqueous solution, that is, until a solid-liquid equilibrium state can be reached. Then, the additive remaining in a solid state in the aqueous solution is recovered therefrom as a cake by filtration, and dried, and the weight of the dried cake is measured. By subtracting the weight of the cake from total weight of the additive as added, a net weight of the additive as added is obtained, and the solubility in % by weight (total saturated concentration) of the total solutes at 0° C. is obtained therefrom. By changing the weight of the additive to the aqueous solution of the main agent at the saturated concentration while adding a given amount of water thereto, a mixing ratio of the additive to the total of the main agent and the additive (total solutes) by weight is changed to obtain changes in solubility (total saturated concentration) of the total solutes with changing mixing ratios.

In the following Examples and Comparative Example, the mixing ratio by weight defined by the following formula is used.

Mixing ratio by weight $(X) = A/(A+B)$ where
- A: weight of a halide, which will take a dihydrate form at room temperature, as an additive
- B: weight of a halide, which will take a hexahydrate form at room temperature, as a main agent
- $X=0$ means only the main agent, and $X=1$ means only the additive.

EXAMPLE 1

Figure 2:
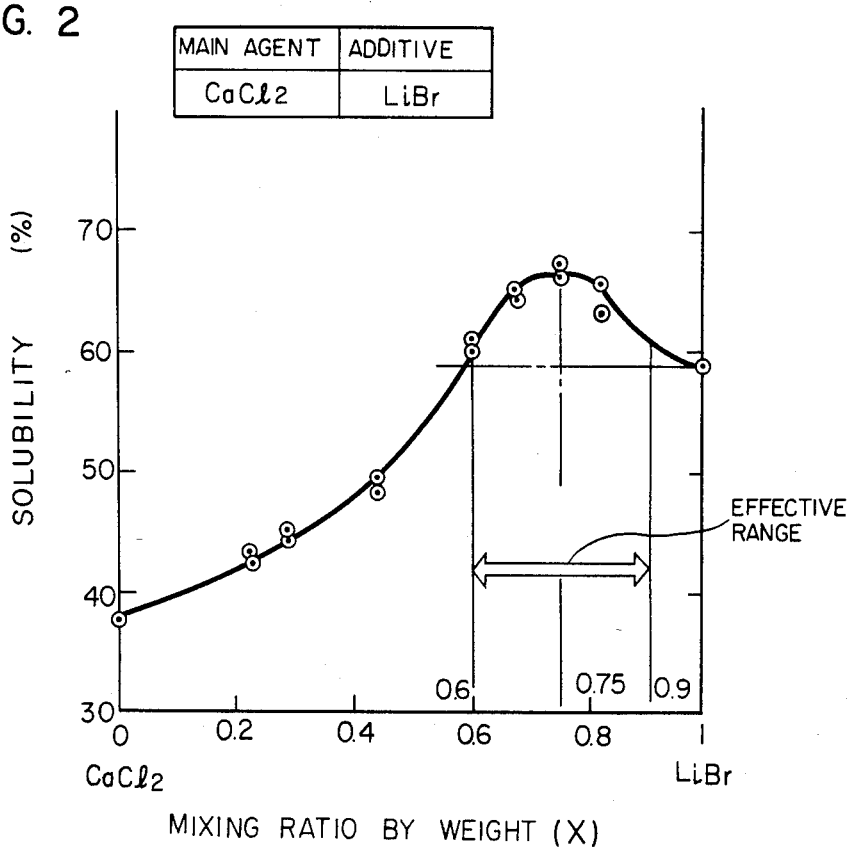
FIGS. 2 and 3 are characteristic diagrams each showing a relationship between the mixing ratio by weight and the solubility (total saturated concentration) of an absorbent in an aqueous solution containing a main agent and an additive according to embodiments of the present invention.

In FIG. 2 a relationship between the mixing ratio (X) and the solubility (total saturated concentration) in water of an absorbent composed of calcium chloride taking a hexahydrate form at room temperature as a main agent and lithium bromide taking a dihydrate form at room temperature as an additive is shown. It can be seen from FIG. 2 that the solubility of the absorbent has a peak (maximum solubility: 67% by weight) in a mixing ratio of 0.75 and the solubility can be increased by mixing the main agent with the additive.

Figure 1:
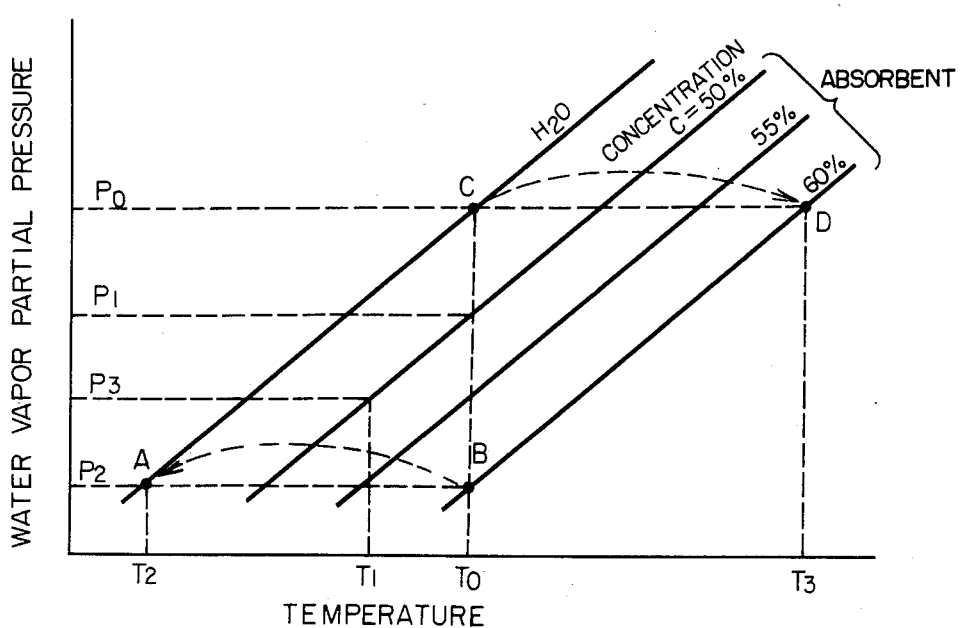
FIG. 1 is a diagram schematically showing a relationship between the water vapor partial pressure and the temperature of an aqueous solution of an absorbent through concentrations of the aqueous solution as parameters.

When a range of the mixing ratios in which the solubility of the absorbent can be above the higher solubility of either the single main agent or the single additive [in the case of FIG. 1, the higher solubility is 59% by weight of single lithium bromide in water $(X=1.0)$] is made "effective range", the effective range is $X=0.6-0.9$.

EXAMPLE 2

Figure 3:
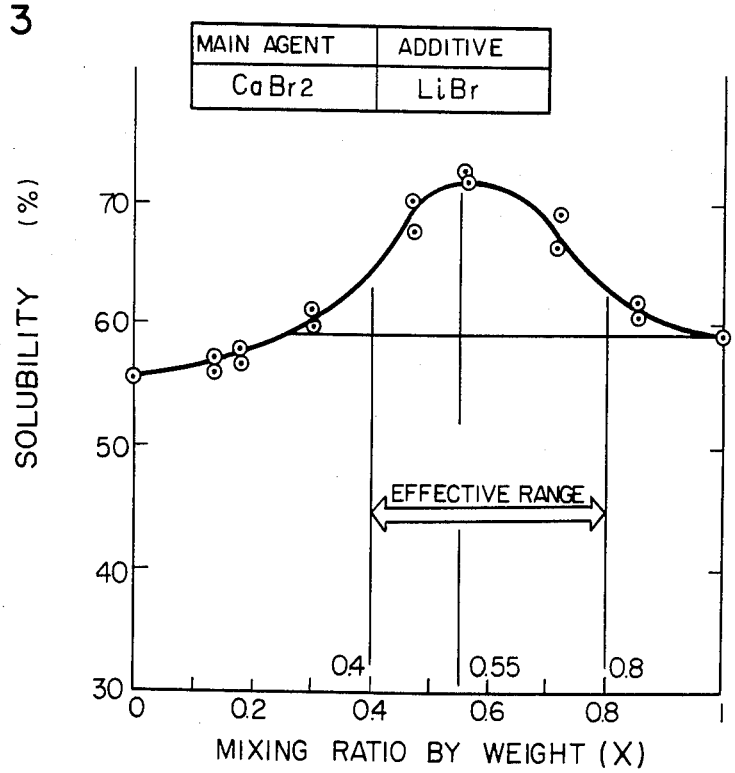

In FIG. 3, a relationship between the mixing ratio (X) and the solubility (total saturated concentration) in water of an absorbent composed of calcium bromide taking a hexahydrate form at room temperature as a main agent and lithium bromide taking a dihydrate form at room temperature as an additive is shown. It can be seen from FIG. 3 that the solubility of the absorbent in water has a peak in a miXing ratio of 0.55 and the solubility can be increased by miXing the main agent with the additive. The effective range is $X=0.4-0.8$.

COMPARATIVE EXAMPLE

Figure 4:
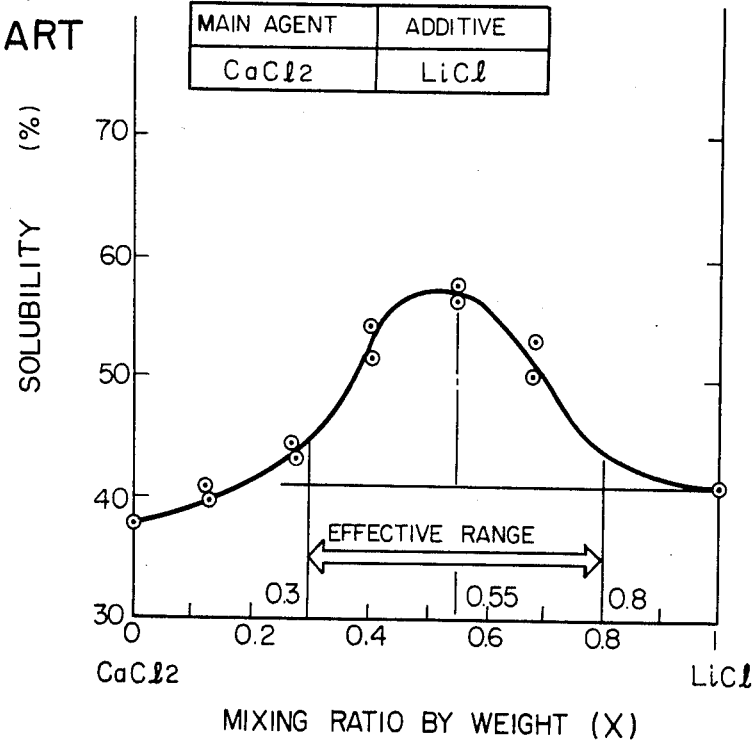
FIG. 4 is a characteristic diagram showing a relationship between the mixing ratio and the solubility (total saturated concentration) of an absorbent in an aqueous solution containing two different chlorides according to the prior art.

In FIG. 4, a relationship between the mixing ratio (X) and the solubility (total saturated concentration) in water of an absorbent composed of calcium chloride taking a hexahydrate form at room temperature as a main agent and lithium chloride taking a dihydrate form at room temperature as an additive according to the prior art is shown. It can be seen from FIG. 4 that the solubility in water of the absorbent has a peak in a mixing ratio of 0.55, that is, the maximum solubility is 56% by weight, which is lower than those of Examples 1 and 2, because no such a bromide having a high solubility is used as the additive.

Optimum mixing ratio by weight more or less depends upon the species of the compounds, and the solubility largely depends upon the number of water molecules to be hydrated with the compounds. Thus, the results of the foregoing Examples and Comparative Examples are rearranged by way of mixing ratio by mole (Y) as defined according to the following formula, and the rearranged results are shown in FIG. 5.

Mixing ratio by mole (Y) = A/(A+B)

where
A: moles of a halide, which will take a dihydrate form at room temperature, as an additive
B: moles of a halide, which will take a hexahydrate form at room temperature, as a main agent
Y=0 means only the main agent and Y=1 means only the additive.

Figure 5:
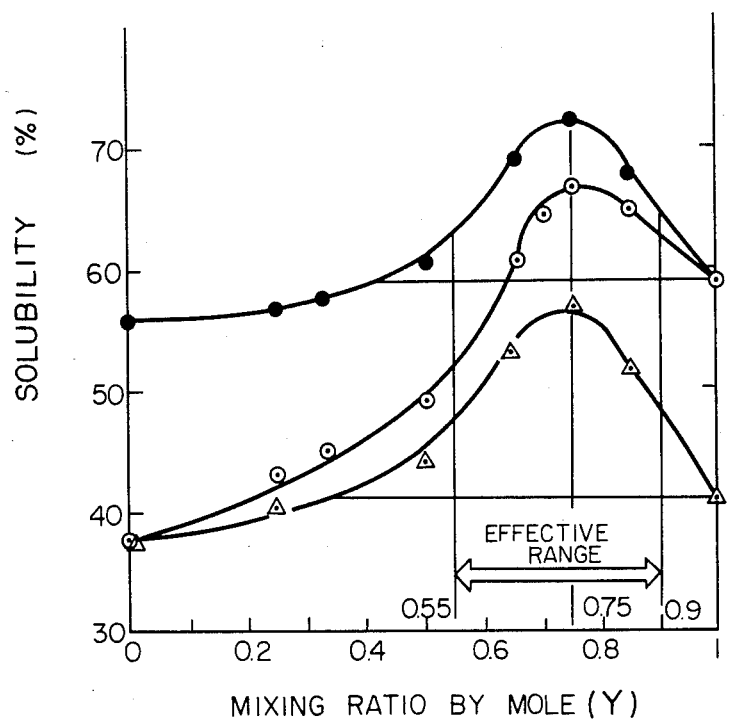
FIG. 5 is a diagram summarizing the relationships shown in FIGS. 2 to 4 by way of a relationship between the mixing ratio by mole and the solubility (total saturated concentration) of absorbents in aqueous solutions.

It can be seen from FIG. 5 that the optimum mixing ratio by mole (Y), that is, a peak, is 0.75, irrespectively of the species of halides, and the effective range is Y=0.55–0.9.

The necessary solubility in water for the absorbent is at least 58% by weight, and thus the chloride system of the prior art ($CaCl_2$- LiCl) is not appropriate.

Thus, the optimum mixing ratio by mole is 0.75, irrespectively of the species of the halides, as mentioned above, and the effective range is Y=0.55–0.9.

Taking into account the fact that the optimum mixing ratio by mole and the effective range largely depend upon the number of water molecules to be hydrated with halides, it has been experimentally confirmed that these values are common to the bromides taking a dihydrate form at room temperature or halides taking a hexahydrate form at room temperature.

The increase in the solubility is based on changing of an affinity of one ion species toward water molecules with another coexisting ion species.

The foregoing description has been directed to an absorbent in an aqueous solution composed of halides in view of the solubility, water vapor absorbability, stability and safety, but the present invention is not limited thereto. That is, the hydration is a special case of "solvation" where solute ions (or solute molecules) are surrounded with solvent molecules in a solution to stabilize the solute ions (or solute molecules) and the solvent is water, and thus the present invention is not limited to an aqueous solution (hydration), and is applicable to solutions in other solvents capable of undergoing solvation, for example, solutions in solvents capable of complexes based on coordination bonds, for example, solutions in methyl alcohol and ethyl alcohol.

The present absorbent in an aqueous solution can be applied as an absorbent directly to the existing absorption-type refrigerator, heat pump, etc.

Embodiments of an absorption-type refrigerator using the present absorbent in an aqueous solution will be described below.

EXAMPLE 3

Figure 6:
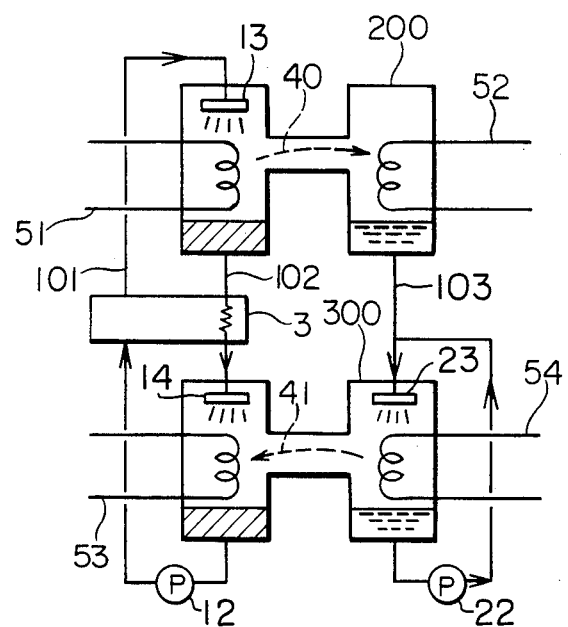
FIG. 6 shows another embodiment of a closed, cyclic absorption-type refrigerator using an absorbent in an aqueous solution according to the present invention.

In FIG. 6, an embodiment of a closed, cyclic absorption-type refrigerator using the present absorbent in an aqueous solution is shown, and basically comprises a concentration section 200 and a dilution section 300 for the absorbent.

In the concentration section 200, hot water is passed through a heat transfer pipe 51 and cooling water is passed through a heat transfer pipe 52. An aqueous dilute absorbent solution 101 is sprayed over the outer surface of the heat transfer pipe 51 from a spray nozzle 13, heated and concentrated while generating water vapor 40, and the resulting concentrated solution 102 is led to the dilution section 300 through a heat exchanger 3. The generated water vapor 40 is cooled and condensed to water at the outer surface of the heat transfer pipe 52 and led to the dilution section 300. On the other hand, in the dilution section 300, when cooling water is passed through a heat transfer pipe 53, cold water is obtained from a heat transfer pipe 54. That is, when an aqueous concentrated absorbent solution 102 is sprayed over the outer surface of the heat transfer pipe 53 from a spray nozzle 14, the aqueous concentrated absorbent solution is cooled, while absorbing water vapor existing in the space, whereby the pressure in the space is lowered. On the other hand, when water 103 from the concentration reaction or water recycled by a pump 22 is sprayed over the outer surface of the heat transfer pipe 54 l from a spray nozzle 23, the pressure is lowered in the space, and the water is evaporated by itself, and the heat transfer pipe 54 is cooled by the latent heat of vaporization. Thus, cold water is obtained from the heat transfer pipe 54. The water vapor 41 generated by the evaporation of water by itself is continuously absorbed into the aqueous concentrated absorbent solution 102 on the outer surface of the heat transfer pipe 53, and thus the evaporation of water by itself is continued. The aqueous dilute absorbent solution 101 resulting from the absorption of water vapor is recycled through the heat exchange 3 to the concentration reaction 200 by a pump 12.

The foregoing embodiment is directed to the absorption-type refrigeration cycle.

Hot water can be produced in an absorption heat pump having the similar structure to that shown in FIG. 6, where the concentration section 200 is operated in the same manner as above, whereas hot water can be produced through the heat transfer pipe 53 by recovering the heat (heat of condensation and heat of dilution) generated when the absorbent 102 absorbs water vapor at the heat transfer pipe 53 in the dilution section 300.

What is claimed is:

1. An absorbent in a solution, which comprises at least one of LiBr and $BaBr_2$ taking a dihydrate form at room temperature and at least one of $MgCl_2$, $CaCl_2$, $NiCl_2$, $CoCl_2$, $MgBr_2$, $CaBr_2$, $NiBr_2$ and $CoBr_2$ taking a hexahydrate form at room temperature in a mixing ratio by mole of the dihydrate to the total of the dihydrate and the hexahydrate of 0.55 to 0.9.

2. An absorbent in a solution according to claim 1, wherein the solution is an aqueous solution.

3. A closed, cyclic absorption-type refrigerator which comprises an absorbent in an aqueous solution comprising at least one of LiBr and $BaBr_2$ taking a dihydrate form at room temperature and at least one of $MgCl_2$, $CaCl_2$, $NiCl_2$, $CoCl_2$, $MgBr_2$, $CaBr_2$, $NiBr_2$ and $CoBr_2$ taking a hexahydrate form at room temperature in a mixing ratio by mole of dihydrate to the total of the dihydrate and the hexahydrate of 0.55 to 0.9.

4. An absorbent in a solution according to claim 1, wherein the absorbent is a combination of LiBr-$CaCl_2$, or LiBr-$CaBr_2$.

5. An absorbent in a solution according to claim 1, wherein said absorbent is an absorbent for an absorption-type refrigerator.

* * * * *